US009201974B2

(12) United States Patent
Arrasvuori et al.

(10) Patent No.: US 9,201,974 B2
(45) Date of Patent: Dec. 1, 2015

(54) METHOD AND APPARATUS FOR INCORPORATING MEDIA ELEMENTS FROM CONTENT ITEMS IN LOCATION-BASED VIEWING

(75) Inventors: Juha Henrik Arrasvuori, Tampere (FI); Jukka Antero Holm, Tampere (FI); Arto Juhani Lehtiniemi, Lempaala (FI); Antti Johannes Eronen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 181 days.

(21) Appl. No.: 13/601,640

(22) Filed: Aug. 31, 2012

(65) Prior Publication Data

US 2014/0068444 A1    Mar. 6, 2014

(51) Int. Cl.
 *G06F 3/048* (2013.01)
 *G01C 21/20* (2006.01)
 *G06F 17/30* (2006.01)
 *G06F 3/0484* (2013.01)

(52) U.S. Cl.
 CPC .......... *G06F 17/3087* (2013.01); *G06F 3/0484* (2013.01)

(58) Field of Classification Search
 USPC .......................................... 701/439; 715/790
 See application file for complete search history.

(56) References Cited

U.S. PATENT DOCUMENTS

| | | | |
|---|---|---|---|
| 7,224,365 B1 | 5/2007 | Seideman et al. | |
| 7,872,669 B2 * | 1/2011 | Darrell et al. | 348/207.1 |
| 8,056,112 B2 * | 11/2011 | Lee | 725/145 |
| 2002/0065604 A1 * | 5/2002 | Sekiyama | 701/209 |
| 2008/0120294 A1 * | 5/2008 | Davis | 707/6 |
| 2009/0113296 A1 | 4/2009 | Lacy et al. | |
| 2009/0157509 A1 * | 6/2009 | Little et al. | 705/14 |
| 2010/0087209 A1 * | 4/2010 | Holm et al. | 455/457 |
| 2010/0260426 A1 * | 10/2010 | Huang et al. | 382/218 |
| 2011/0063301 A1 * | 3/2011 | Setlur et al. | 345/441 |
| 2011/0071757 A1 * | 3/2011 | Lee et al. | 701/208 |
| 2011/0173565 A1 * | 7/2011 | Ofek et al. | 715/790 |
| 2011/0209201 A1 * | 8/2011 | Chollat | 726/4 |
| 2011/0258188 A1 * | 10/2011 | AbdAlmageed et al. | 707/736 |
| 2011/0270517 A1 | 11/2011 | Benedetti | |
| 2011/0279445 A1 * | 11/2011 | Murphy et al. | 345/419 |
| 2011/0296287 A1 * | 12/2011 | Shahraray et al. | 715/202 |
| 2012/0050324 A1 * | 3/2012 | Jeong et al. | 345/633 |
| 2012/0096361 A1 * | 4/2012 | Osten | 715/731 |
| 2012/0192115 A1 * | 7/2012 | Falchuk et al. | 715/850 |
| 2013/0347018 A1 * | 12/2013 | Limp et al. | 725/19 |
| 2014/0039792 A1 * | 2/2014 | Seetharam | 701/538 |

FOREIGN PATENT DOCUMENTS

| | | | |
|---|---|---|---|
| EP | 2 333 488 A2 | 6/2011 | |
| WO | WO 2008027154 A1 * | 3/2008 | G06F 17/30 |
| WO | WO 2011/049870 A1 | 4/2011 | |
| WO | WO 2011/067468 A2 | 6/2011 | |

* cited by examiner

*Primary Examiner* — Jennifer To
*Assistant Examiner* — Sunil Sundar
(74) *Attorney, Agent, or Firm* — Ditthavong & Steiner, P.C.

(57) ABSTRACT

An approach is provided for incorporating media elements from content items into associated locations presented by a location-based view. A media element platform determines one or more locations associated with at least one location-based view. The media element platform further determines one or more content items associated with the one or more locations. The media element platform also processes the one or more content items to extract one or more media elements. The media element platform further causes a presentation of the one or more media elements in the at least one location-based view.

16 Claims, 14 Drawing Sheets

METHOD AND APPARATUS FOR INCORPORATING MEDIA ELEMENTS FROM CONTENT ITEMS IN LOCATION-BASED VIEWING

BACKGROUND

Service providers and device manufacturers (e.g., wireless, cellular, etc.) are continually challenged to deliver value and convenience to consumers by, for example, providing compelling network services. One such service involves providing information regarding locations in location-based views. The location-based views may include, for example, mapping services and/or augmented reality services that provide information regarding a geographic region or with respect to a location. However, such location-based services provide little more than information regarding a location and, thus, do not provide any entertainment value to a user. Therefore, services providers and device manufacturers face significant technical challenges in incorporating entertainment value in the location-based views that may also provide avenues for information provisioning to a user.

SOME EXAMPLE EMBODIMENTS

Therefore, there is a need for an approach for incorporating media elements from content items into associated locations presented by a location-based view.

According to one embodiment, a method comprises determining one or more locations associated with at least one location-based view. The method also comprises determining one or more content items associated with the one or more locations. The method further comprises processing the one or more content items to extract one or more media elements. The method also comprises causing, at least in part, a presentation of the one or more media elements in the at least one location-based view in association with the one or more locations.

According to another embodiment, an apparatus comprises at least one processor, and at least one memory including computer program code for one or more computer programs, the at least one memory and the computer program code configured to, with the at least one processor, cause, at least in part, the apparatus to determine one or more locations associated with at least one location-based view. The apparatus is also caused to determine one or more content items associated with the one or more locations. The apparatus is further caused to process the one or more content items to extract one or more media elements. The apparatus is further caused to present the one or more media elements in the at least one location-based view in association with the one or more locations.

According to another embodiment, a computer-readable storage medium carries one or more sequences of one or more instructions which, when executed by one or more processors, cause, at least in part, an apparatus to determine one or more locations associated with at least one location-based view. The apparatus is also caused to determine one or more content items associated with the one or more locations. The apparatus is further caused to process the one or more content items to extract one or more media elements. The apparatus is also caused to present the one or more media elements in the at least one location-based view in association with the one or more locations.

According to another embodiment, an apparatus comprises means for determining one or more locations associated with at least one location-based view. The apparatus also comprises means for determining one or more content items associated with the one or more locations. The apparatus further comprises means for processing the one or more content items to extract one or more media elements. The apparatus further comprises means for causing, at least in part, a presentation of the one or more media elements in the at least one location-based view in association with the one or more locations.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for incorporating media elements from content items into associated locations presented by a location-based view are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
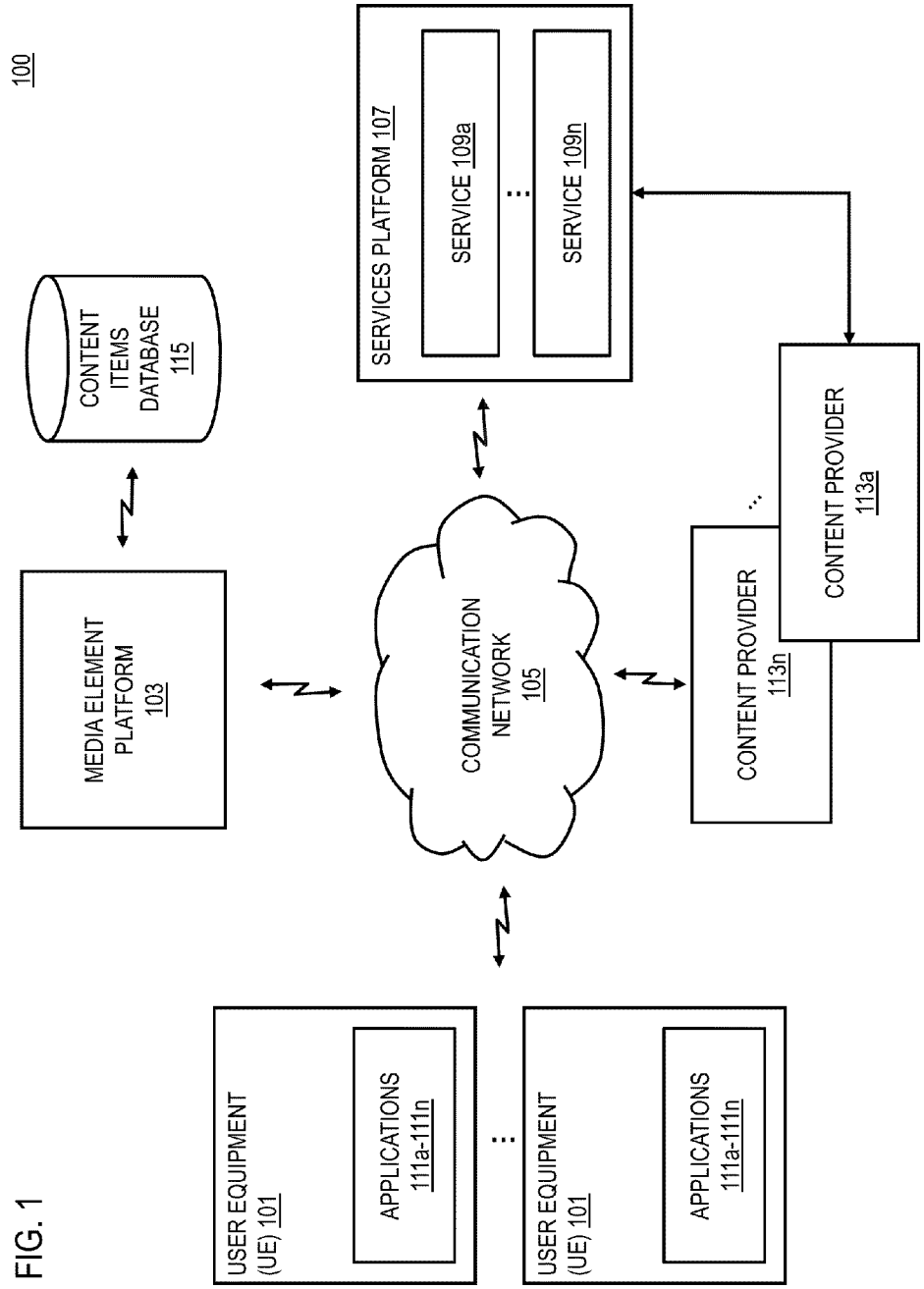
FIG. 1 is a diagram of a system capable of incorporating media elements from content items into associated locations presented by a location-based view, according to one embodiment.

FIG. 1 is a diagram of a system capable of incorporating media elements from content items into associated locations presented by a location-based view, according to one embodiment. As discussed above, existing applications and/or services that provide location-based views generally provide only location information associated with the viewed locations, such as directional information, point of interest information, etc. Thus, current location-based views do not provide any entertainment value to a user. There is no draw by the location-based views to the user other than to receive information regarding a location. Thus, unless the user, for example, desires to find directions to a point of interest or is trying to find a specific address, the user has little use or desire to use the location-based views.

To address this problem, a system 100 of FIG. 1 introduces the capability to incorporate media elements from content items into associated locations presented by a location-based view. The system 100 provides the ability to determine a location, determine a content item associated with the location, extract a media element from the content item that is also associated with the location, and then present the media element within a location-based view including the location. Accordingly, a user viewing a location-based view receives a higher entertainment value by being able to view media elements incorporated into the location-based views. The system 100 also provides an avenue for the user to interact with the media elements, such as by accessing services and/or content providers that provide content items from which the media elements were extracted.

As shown in FIG. 1, the system 100 comprises user equipment (UE) 101a-101n (collectively referred to as UE 101) having connectivity to a media element platform 103 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, near field communication (NFC), Internet Protocol (IP) data casting, digital radio/television broadcasting, satellite, mobile ad-hoc network (MANET), and the like, or any combination thereof.

The UE 101 is any type of mobile terminal, fixed terminal, or portable terminal including a mobile handset, station, unit, device, mobile communication device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

The UE 101 may include one or more applications 111a-111n (collectively referred to as applications 111). The applications 111 may execute at the UE 101 to provide one or more functions and/or services at the UE 101. By way of example, the applications 111 may include mapping, augmented reality, navigation, calendar, Internet browsing, and communication applications. In one embodiment, one or more of the applications 111 may be associated with the media element platform 103 such that one or more of the services, processes and/or functions provided by the media element platform 103 are partially or entirely performed at the UE 101.

The system 100 may further include a services platform 107 that includes one or more services 109a-109n (collectively referred to as services 109). The services 109 may be any type of service that may be provided to one or more elements of the system 100. By way of example, the one or more services 109 may include mapping, augmented reality, navigation, calendar, Internet browsing, and communication services. In one embodiment, the functions and/or services provided by the media element platform 103 may be partially or entirely performed by one or more of the services 109 of the services platform 107.

The system 100 may further include one or more content providers 113a-113n (collectively referred to as content providers 113). The content providers 113 may provide various content to the elements of the system 100, such as to the user equipment 101 and the media element platform 103. The content may be, for example, various content items, such as audio, images and video. By way of specific examples, the content items may be one or more songs, sound clips, pictures, posters, billboard images, cinemagraphs, movies, music videos or other multimedia content, as discussed below. Thus, one of the content items provided by the content providers 113 may be a movie that may be analyzed for various media elements (discussed in detail below).

In one embodiment, the system 100 may include a content items database 115. The content items database 115 may include one or more content items that were originally from the content providers 113 and subsequently stored within the content items database 115. However, the content items database 115 may include content items from any other element of the system 100, such as from the UE 101 and/or from the services 109 at the services platform 107. In one embodiment, the content items database 115 also includes and/or stores information regarding one or more media elements that were previously extracted from one or more content items by the media element platform 103, such as presentation characteristics. The content items database 115 may also include information associated with the media element, such as the location and/or location-based view that is associated with the media element, in addition to one or more media element vectors that were determined for the media element (discussed in detail below).

The media element platform 103 performs one or more processes and/or functions associated with incorporating media elements from content items into associated locations presented by a location-based view for the system 100. The media element platform 103 determines one or more locations associated with at least one location-based view. The location-based view may be, for example, a two-dimensional (2D) representation of a geographical area (e.g., a top-down view of a map, a panoramic view of a map, a bird's eye view of a map, etc.). The location-based view may also be, for example, a three-dimensional (3D) representation of a geographical area (e.g., a city skyline, a city block, a 3D representation of a building). The 3D location-based view may include a model of a geographic area, and may further have a 2D image of the geographic area mapped to the model. The location-based view may also include a mediated-reality, augmented-reality, or virtual-reality based view. By way of example, an augmented reality location-based view may include a live image of a geographic area that is augmented by having virtual objects overlaid on the image of the geographic area. According to any of the above, the location-based view may be presented such that one or more media elements may be incorporated into the location-based view, as discussed in detail below. Further, by encompassing both mediated reality, augmented reality and/or virtual reality, and 2D/3D location-based views, the user viewing the location-based view may or may not be physically present in the same location he/she is viewing. Rather, in one embodiment, the user may be virtually viewing a location while in a different physical location.

The location associated with the location-based view may have various granularities, such as the location being an entire city, a bridge within the city, a block within the city, a building within the block, a building wall, a floor of the building, a façade, or a particular window associated with the floor of the building, or the like. Further, in one embodiment, a location associated with a location based-view may include only one level of the granularity, or may include multiple levels of granularity. Where the location associated with a location-based view is a building, the granularity level of the building is presented, as well as the granularity level of the window, if such a distinction between granularity levels is present. There may also be more than one location present within a location-based view. By way of example, two buildings within a city may be associated with a location-based view by being represented within the location-based view. Each building may be considered a separate location associated with the location-based view.

The media element platform 103 further determines one or more content items associated with the one or more locations. The one or more content items may be any type of content item that may be associated with a location. By way of example, the content items may include one or more images, one or more videos, one or more sounds, or a combination thereof. The one or more images may include, for example, one or more photographs, one or more pieces of artwork (e.g., paintings, sculptures, etc.) one or more movie posters, one or more cinemagraphs. The one or more images may include a compilation of one or more images, such as a compilation of images of pages of a book, pages of a manuscript, or pages from a magazine. The one or more images may also represent plain text. The one or more videos may be any type of video or combination of images to form a moving picture. By way of example, the one or more videos may include one or more television shows, one or more documentaries, one or more movies, one or more miniseries, etc. The one or more videos may also include recordings of one or more events, such as one or more news videos, one or more videos of plays or music performances, etc. The one or more sounds may include sounds that are associated with the one or more images and/or the one or more videos. By way of example, the one or more sounds may be an audio track from movie, including the soundtrack of the movie, sound effects of the movie, and the dialogue of the movie. The one or more sounds may also be unrelated to the one or more images and one or more videos but may instead be separate or independent recordings of sounds, music and the like.

The content items are associated with the one or more locations by having the location included within the content items or being related to the content items. By way of example, where the Empire State building is the location associated with a location-based view, the one or more content items that are associated with the Empire State building are content items that include or are regarding the Empire State building, as either a main subject or an ancillary subject. For example, a documentary about the Empire State building is associated with the location of the Empire State building because the documentary most likely has views of the building. Further, a movie regarding King Kong that includes a scene where King Kong climbs the Empire State building is also associated with the location of the Empire State building, even though the building may be an ancillary subject within the movie because there may be a little as one scene within the movie that includes the Empire State building. By way of another example, a book may be associated with the location of the Empire State building if, for example, a scene or chapter within the book takes place near the Empire State building. Also, a book may be associated with the Empire State building if, for example, one or more images within the book include images of the Empire State building.

The media element platform 103 further processes the one or more content items that are associated with the one or more locations that are associated with the at least one location-based view to extract one or more media elements. The one or more media elements that are extracted from the content items are the media elements that associate the content items with the locations, or that associate the content items with the location. Thus, based on the above example, the media element that associates the movie King Kong with the Empire State building may be the scene in the movie of King Kong climbing the Empire State building. The specific media element that may be extracted is the animation of King Kong. The media element within a book that associates the book with the Empire State building may be the passage of text that concerns the Empire State building, or that may occur within the vicinity of the Empire State building. Thus, by way of example, the passage of text that is extracted from a book (e.g., the content item) with respect to the location of the Empire State building is the passage of text that describes King Kong climbing the Empire State building. The media elements may be extracted within or without the representation of the location that may be included within the content item. Thus, by way of example, a clip of King Kong climbing the Empire State building may be the media element that is extracted from the content item of King Kong the movie. The media element may include the image of the Empire State building, or may solely by of King Kong without the Empire State building. Further, the passage of text that describes the Empire State building within a book may be extracted from the book.

In one embodiment, the media element platform 103 may perform the actual extraction of a media element from a content item. Thus, in some cases, such identification and extracting of media elements could be done automatically or semi-automatically. For example, the media element platform 103 may utilize footage received from movie studios where sequences associated with a media element are filmed on top of green/blue background, which may lend to extracting the media element. The media element platform 103 may look in the content item (e.g., a movie) for a sequence of consecutive frames that can be automatically cropped in order to show an animated sequence of a media element (a character in the case of King Kong) performing an action (such as climbing). Further, the media element is created by creating a looped animation of a sequence of frames from the movie. Where there may not be enough frames to make an entire animation, in one embodiment, the media element can be created based on cinemagraph, which is a set of frames that are extracted from a video content item that include only a small amount of animation, or generally still images that include an animated portion out of the entire image.

In one embodiment, the media element platform 103 may not perform the actual extraction but may instead extract the media element from the content item by, for example, retrieving a media element from a database that includes media elements stored in relation to the content items from which they originate. In this example, the media element platform 103 may query a database, such as provided by the content providers 113, or by the content items database 115, to retrieve the media elements within the content items that provide the association between the content item and the location. The databases may be populated by, for example, one or more services 109 that identify media elements, such as the King Kong, denote the boundaries of the King Kong media element on video frames, and indicate a suitable time segment from which a short animated segment could be cropped.

By way of another example, the media element may be an image, such as an image from a poster or an album cover (e.g., the content item). An image from the poster may be extracted (e.g., cropped) from the poster and presented in association with a location that the poster is associated with. In this embodiment, the poster can include text that can also be extracted with known optical character recognition (OCR) methods. The text may be combined with the image extracted from the poster as one media element, or may be extracted as a separate media element.

Subsequently, the media element platform 103 causes a presentation of the one or more media elements in the at least one location-based view in association with the one or more locations. Thus, according to the above example with King Kong, the media element of the animation of King Kong climbing the Empire State building may be associated with the representation of the Empire State building in the location-based view. Thus, where the location-based view includes a skyline of New York City that includes the Empire State building, the media element platform 103 may cause an animation of King Kong to appear climbing the representation of the Empire State building.

In one embodiment, the presentation of the media element in association with the location of the location-based view may consider the viewing characteristics within the location-based view of the location, and the viewing characteristics of the media element within the content item. For example, if the location is the Empire State building and the media element is King Kong, the viewing angle may be 360 degrees around the building (since the climbing on the side of the Empire State building looks nearly the same regardless of the viewing angle). In some other media elements, the media elements might be assigned to a more limited viewing angle, such as a 45 degree angle from the façade of a building (if the media element is such that it fits nicely only when viewed on the façade side of a building).

Thus, for example, when a user views in a 3D map a location from a certain vantage point, a media element that is extracted from a content item may maintain the same viewing characteristics within the location-based view as the media element possess in the content item. Thus, in one embodiment, the media element may be cropped from the content item and be shown in the same location in a 3D map as the media element appears in the content item. If the viewing characteristics of the location-based view do not match, according to a set threshold, the viewing characteristics of the media element within the content item, the media element may not appear within the location-based view. Thus, for example, if the user is viewing the Empire State building in a 2D top-down location-based view, the media element of the animation of King Kong may not appear.

In one embodiment, however, the media element platform 103 may perform additional analysis and manipulation on extracted media elements to transform the media elements into different location-based views that may not have the same viewing characteristics as the viewing characteristics in the content items. Thus, where a user is viewing a 2D view on the Empire State building, the media element platform 103 may associate a 2D view of King Kong with the Empire State building, such as a 2D King Kong attached to the side of a 2D Empire State building.

Further, because the media element is extracted from the content item, in the case where the media element is an animation, the media element can be looped. Thus, for example, a character embodying the media element can be presented performing an action for a longer time or longer distance than in the original movie (e.g., content item). By way of example, in the 1933 version of King Kong, King Kong is shown climbing to the top of the Empire State building only for a few seconds in the movie. However, the media element platform 103 may cause a looping of the media element presented with respect to the location. Thus, although a few consecutive frames of King Kong's climbing motion can be cropped, the resulting climbing animation can be repeatedly shown (e.g., from the bottom to the top of the building, repeatedly). Further, the media element may be reversed such that, in the same example, King Kong may climb to the top of the building and then climb back down the building, repeatedly. This way, the media element like King Kong may be infinitely shown climbing up and down the Empire State Building when viewing the building. Thus, based on the above presentation, the media element platform 103 allows for the presenting of a media element associated with a location within a location-based view that mimics, at least in part, the presentation of the media element within the content item.

Where the media element is an image from a poster, based on the above example, these media element can appear in the location-based view in the location associated with the poster. Thus, for example, where a poster of King Kong shows King Kong coming out of a group of trees, an image of King Kong may be presented coming of out a location of a group of trees included in a presentation of a location-based view. Further, where text from the poster is extracted as a separate media element, the text can be rendered within the location-based view as a separate media element. By way of example, the text can be displayed as a neon sign on a building during night time or be embedded in a billboard in a way that associates the text with the location as the location is associated with the content item.

Although the above examples are provided mainly with respect to media elements such as animations from one or more content items such as movies, the same analysis and presentation may be performed for the other types of content items and associated media elements. By way of example, where the content item is a book, the media element platform 103 may extract the text from the book and present the text in relation to a location within a location-based view that is associated with the text. Thus, where the text is associated with the Empire State building, such as text describing how the columns were constructed, the text describing the construction of the columns may be placed in relation to the columns of a representation of the Empire State building in the location-based view. As discussed in detail below, the flow of the text may be changed to provide flexibility in how the text is presented in relation to the location within the location-based view.

In one embodiment, the media element platform 103 may analyze one or more text-based content items, such as books, to determine information about the locations presented in the books. The media element platform 103 may alternatively, or additionally, obtain information regarding the locations from the content providers 113, the services 109, and/or the content items database 115, if such sources contain such information. With respect to e-books, for example, or other text that is in a format that allows for semantically analyzing the text, the text may be analyzed to determine the location described in a page or chapter of the book. This analysis may be done automatically (e.g., through keyword analysis) and/or manually by human curators or by community provided tags. Associations between sections of the text and locations may be expressed, for example, as latitude/longitude coordinates and may be stored in a database (e.g., the content items database 115). The association data may comprise, for example, a data entry, such as, [product_id; start page; start line; end page; end line; latitude; longitude], where product id links to the original text (such as an e-book), start page and start line indicate the page number and line number, respectively, of the beginning of the section linked to the location described by the coordinates in latitude and longitude. Correspondingly, end page and end line define the end of the section associated to the location.

In one embodiment, the media element platform 103 processes the one or more media elements with respect to the one or more locations to determine one or more media element vectors. In the case of videos as the content items, the one or more media element vectors may represent the direction of the movement of the media element within the content item that is to be reproduced within the location-based view in relation to the location. Thus, in the example of King Kong, the media element vector may be determined based on the movement of King Kong climbing up the Empire State building. The media element platform 103 may further interpolate the direction and range of movement of the media element within the content item to extend or vary the media element vector within the location-based view. By way of example, depending on the size of the animation of King Kong in relation to the size of the Empire State building, the media element vector may need to be lengthened or shortened.

Further, where the media element represents, for example, one or more planes flying around King Kong while he is climbing up the Empire State building, the media element vectors may represent the flight paths of the planes. The flight paths of the planes may be interpolated to connect the ends to create a continuous animation of the planes. In one embodiment, the media element vector is associated with a surface of the location within the location-based view. Thus, where the location is a building, the media element vector may be associated with a horizontal and/or vertical surface associated with the building. In the case of King Kong, the surface may be the vertical surface of the edge of the Empire State building that King Kong climbs. The media element platform 103 may then present the media elements based on the media element vectors.

In one embodiment, the media element platform 103 may interpolate the media element to develop the ability for the media element to interact with the user. The user may interact with the media element based on one or more inputs at the UE 101 while the media element is presented in the location-based view. By way of example, where the UE 101 includes a touch screen, the user may touch points on the touch screen near the presentation of the media element and the media element platform 103 may register the inputs of the user and manipulate the media element in response. Thus, where the media element is an animation of King Kong, the media element may interact with the user by the representation of King Kong attempting to grab the user's finger when the user touches the touch screen, for example. In one embodiment, if King Kong catches the user's finger, for example, the animation may switch from being associated with the Empire State building, as described above, to being associated with the user's finger. Accordingly, King Kong may appear to climb up and down the user's finger based on, for example, the media element vector being switched from an association with the Empire State building to the user's finger. In one embodiment, the media element platform 103 may adjust the media element vector determined for the media element to account for a change in the shape of the user's finger as compared to the shape of the Empire State building.

In the case of images, such as one or more books and/or text from the books, the media element vectors may represent the direction of flow of the text presented in relation to the location within the location-based view. By way of example, where there are one or more streets in proximity to the location, the text may follow a direction of the street based on the media element vector following the direction of the street. In one embodiment, for a street presented within the location-based view, the media element platform 103 replaces the original street texture with a rendering of a new surface based on a texture of an excerpt from the book. In one embodiment, the location-based view may consist of object outlines (such as a street) and the textures that fill those outlines (such as asphalt for the street block). The text may be rendered in a matching perspective to the street based on the media element vector that matches the perspective of the street based on the viewing characteristics of the location-based view. In one embodiment, the media element platform 103 may superimpose the text as a semi-transparent layer on top of the original street texture. In one embodiment, the media element platform 103 may obtain and or determine the passage from the content item in the form of a file (e.g., a PDF) which may include an image such as a figure. The figure may be rendered into the street outline. In addition to roads/streets, the text excerpts may also be placed on the sky, on building facades, etc.

In one embodiment, the media element vector may be associated with movement of the UE 101a presenting the location based view, movement of the user associated with the UE 101a, or virtual movement within the location-based view. By way of example, only one sentence of a media element (or a few sentences) from an e-book (e.g., content item) may be shown at a time on the street according to a media element vector. As the user moves on the map (virtual location within the location-based view) or his or her physical location (for augmented reality location-based views), the media element may progress along the media element vector so that the user is able to view the next sentence of the media element. Accordingly, in one embodiment, the user is guided to a certain location that is, for example, discussed or revealed in the final sentence of the excerpt. Under this approach, the user can also be guided virtually or physically to a recommended or advertised location or point of interest (POI). Further, this embodiment may be implemented so that the media element platform 103 determines how many steps there are between the user's current location-based view and a desired end location-based view (e.g., a POI), and the text excerpt is divided into that many steps; or the media element platform 103 determines the number of sentences in the excerpt and divides the user's route into that many steps to display one sentence per step. A similar analysis may be performed with respect to the other media elements, such as by performing an animation from a video as the user travels through a region based in terms of the location-based view, or that a sound clip is played based on the user traveling though a region in terms of the location-based view.

In one embodiment, the set of content items that the media element platform 103 selects from to determine media elements to associate with locations may be based on preferences and/or history information associated with the user. Thus, only those media elements that a user may be familiar with (or may not be familiar with) are presented within the location-based view and associated with the location based on the media element platform 103 analyzing history information. Where the content items that are used to determine media elements are those that the user has no history with, and likely not familiar with, presenting media elements associated with these content items is a basis for the user becoming interested in the underlying content items associated with the media elements. Thus, where the user may have never seen the movie King Kong, the user seeing a media element representing King Kong climb a representation of the Empire State building in a location-based view may spark the user's interest in potentially learning more about the media element and the underlying content item (the movie). In one embodiment, the media element may be modified according to whether the user is familiar with the media element based on the user's history. In one embodiment, the filtering and choosing of what content items to extra media elements from to incorporate into a location-based view associated with a location may be done according to the preference information. That is, if the user prefers action movies, a media element extracted from a content item associated with action movie may be presented within the location-based view and associated with the location as opposed to other non-action content items and/or media elements.

By way of example with respect to text, particularly content items such as books, the media element platform 103 may determine a selection of book sections associated with locations visited by the user (e.g., based on media consumption history and interest profile and other known recommendation methods). Also, the selection of e-book sections, for example, shown to a user through an augmented reality location-based view when the user visits a place may be filtered based on the personal profile: for example, if the user prefers action books the selection will be obtained by applying the filter product genre="action" when searching the database (e.g., the content providers 113, services 109 and/or content items database 115).

In one embodiment, the media element platform 103 may determine one or more secondary media elements that are associated with the media element within the content item. The secondary media elements may be considered, for example, as props within the content items that support the media element. By way of example, some of the props for the King Kong example may be the planes that fly around King Kong as he climbs the building, or may be the woman he carries in his hands. The props may also be police cars that surround him on the ground. The secondary media element may be any feature within the content items as long as the these secondary media elements are associated in some way with the media element.

In one embodiment, the media element platform 103 may obtain models of the secondary media elements from a media library (e.g., the content providers, the services 109, and/or the content items database 115) and include the secondary media elements within the location-based view near the presentation of the media element based on these models. Thus, unlike the media element, the secondary media elements are not necessarily extracted from the content items but may instead me represented by standard models. In the case of a movie poster, for example, the media element platform 103 may determine trees of a jungle from a King Kong poster, obtain 3D models of trees and place the trees as secondary media elements near the location where the extracted image from the poster is shown associated with a location in the location-based view. This way, buildings and/or streets surrounding the media element may be decorated in the style of the poster. Similarly, in the case of the movie of King Kong, weather elements such as rain and fog may be detected from the movie and rendered in relation to the media element presented with respect to the location in the location-based view.

In at least one embodiment, the media element platform 103 may have access to a collection of music, such as through one or more content providers 113, one or more services 109 and/or the content items database 115. Based on the access, the media element platform 103 may associate music into the location-based view based on the user playing music and or searching for music. By way of example, if the user is searching for a song (e.g., In My Place by Coldplay), the media element platform 103 may further limit media elements that are incorporated into the location-based view based on the music that is playing at the UE 101 and/or music that a user searches for through the UE 101. Thus, in one example, a music search can work as a trigger for selecting media elements incorporation into an augmented reality. The song that a user searches for (or plays), in addition to locations associated with a location-based view, are used to search for media elements from content items that are associated with the location and the song. By way of example, media elements from movie clips that have the same song playing in the same location are incorporated into the location-based view.

The association of the media element with the location within a location-based view may trigger other functionality at the UE 101. In one embodiment, the association of a media element with a location may further include an area of impact where, when the UE 101 of a user that is presenting the location-based view is within the area of impact, functionality of the UE 101 is changed based on the media element and/or the content item. By way of example, when the user is within a distance from the Empire State building, and if the media element platform 103 has associated the content item and/or the media element of King Kong the movie or King Kong the media element, respectively, to the location, the media element platform 103 may modify the system sounds of the UE 101 to mimic and/or incorporate sounds of content items and/or media elements. Thus, when the user is near the Empire State Building, the system sounds on the UE 101a associated with user may be obtained from the content item of King Kong the movie.

In one embodiment, the media element platform 103 may associate functionality with the media element presented in association with a location in the location-based view. In one example, by clicking on the media element, the user may be directed to one or more services 109 and/or content providers 113 that offer the content items that contained the media elements for sale. By way of example, by selecting a text excerpt, the user may purchase the full e-book, which may be then downloaded to UE 101a that is presenting the location-based view. Alternatively, the user may be directed to purchase a physical book from a service 109a associated with an online store, and the physical book may then be delivered by mail or picked up from the store. In at least one embodiment, the media element platform 103 may be associated with a bookmarking feature, where different sections from a purchased content item may be accessed through the location-based view.

By way of example, the UE 101, the media element platform 103, the services platform 107 and the content providers 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
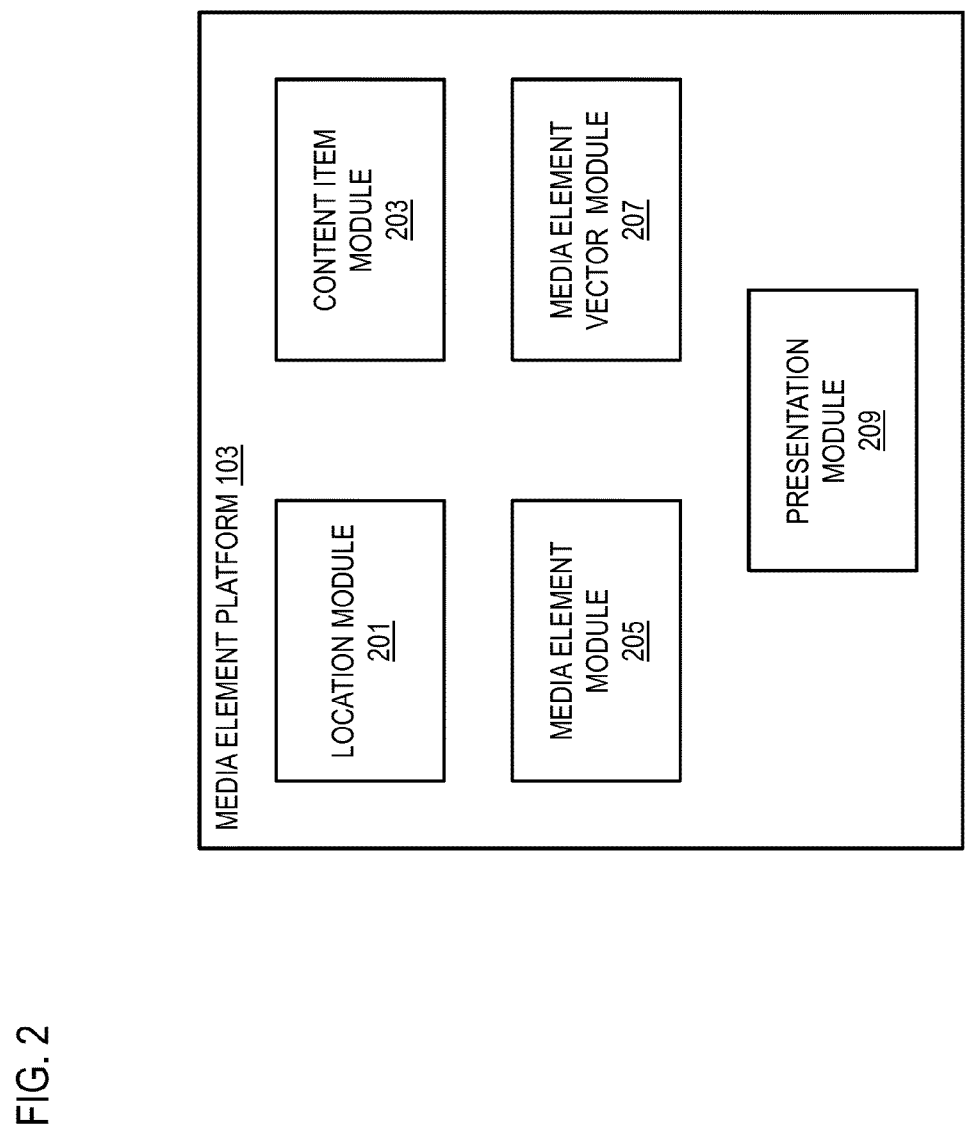
FIG. 2 is a diagram of the components of a media element platform, according to one embodiment.

FIG. 2 is a diagram of the components of the media element platform 103, according to one embodiment. By way of example, the media element platform 103 includes one or more components for incorporating media elements from content items into associated locations presented by a location-based view. It is contemplated that the functions of these components may be combined in one or more components or performed by other components of equivalent functionality. In one embodiment, for example, one or more of the functions of the media element platform 103 may be embodied entirely in the UE 101 (such as in one or more applications 111 at the UE 101), one or more of the services 109 of the services platform 107, one or more of the content providers 113, or any combination thereof. In this embodiment, the media element platform 103 includes a location module 201, a content item module 203, a media element module 205, a media element vector module 207, and a presentation module 209.

The location module 201 determines a location associated with the location-based view. In one embodiment, the application 111a and/or service 109a that provides the location-based view may include processes, functionality, and/or metadata that allows the media element platform 103 to determine one or more locations associated with the location based view. By way of example, the media element platform 103 may receive metadata from a service 109a that provides the location-based view. In one embodiment, the media element platform 103 may be associated with the service 109a that provides the location-based view such that the media element platform 103 can directly access information pertaining to the one or more locations that are presented within the location-based view. The location information received and/or obtained by the media element platform 103 may contain the various levels of granularity associated with the location, as discussed above. The location module 201 can further determine and/or obtain information regarding the type of representation of the location, such as whether the location is represented as a 2D or 3D representation, whether the location-based view is based on an augmented reality view, and the like, such that the location module 201 can provide information to the media element platform 103 regarding how to generate features such as, for example, the media element, secondary media elements, and media element vectors.

The content item module 203 interfaces with one or more content providers 113, one or more services 109, and/or the content items database 115 to access the content items. The content item module 203 further obtains information regarding what locations are associated with the various content items. In one embodiment, the content item module 203 may analyze and process the content items directly based on one or more algorithms (such as semantics-based algorithms, image-recognition-based algorithms, and the like) to determine the locations associated with the content items. In one embodiment, the content items and/or the database containing the content items may provide the information directly to the content item module 203. In one embodiment, upon the content item module 203 determining one or more locations associated with a content item, the content item and the information regarding the content item may be stored in the content items database 115.

The media element module 205 determines the media elements for incorporating into the location-based views. In one embodiment, the media element module 205 may perform the analysis and extraction of the media element from the content item. In one embodiment, the media element module 205 may simply extract the media elements by retrieving the media elements from a database that is associated with the corresponding content item where, for example, the media element is already extracted from the content item. The media element module 205 also performs the processing and/or analysis of the media elements for presenting the media elements within the location-based view. The media element module 205 may perform the processing to interpolate the animation with respect to the media elements.

The media element vector module 207 determines the media element vectors for presenting the media elements within the location-based view. The media element vector may correspond with movement of the media element within the content item to reproduce the movement within the location-based view where, for example, the media element is associated with an animation. The media element vector may correspond with one or more features in the location-based view, such as one or more locations and/or features associated with the locations. Thus, as described above, the media element vector may represent a feature of the location, such as a column within a building where the building is the media element. The media element vector may also represent a street that surrounds the building.

In one embodiment, the media element vector generated by the media element vector module 207 represents a direction of movement associated with presenting the media element, or one or more segments of the media element. Thus, the media element vector module 207 may create a media element vector that is based on the user moving through the location-based view. As the user moves through the location-based view, the user may be presented with different segments and/or portions of the media element via the media element vector. For example, and as discussed above, as a user traverses through a virtual reality, for example, that is presented within the location-based view, the user may be able to see more text associated with the media element. This may also occur with respect to any other type of media element, such as an animation, a sound clip, etc.

In one embodiment, the media element vector module 207 may also determine one or more changes to the media element vector where, for example, the media element platform 103 allows for interactions with the media element. The media element vector module 207 may determine various supplemental media element vectors and/or changes to the media element vectors as the interactions occur, or that are predetermined based on possible interactions that may occur.

The presentation module 209 causes the association between the media element and the location presented by the location-based view so that the location-based view may present the media element. In one embodiment, the presentation module 209 may present the media element to the application 111 and/or service 109 that provides the location-based view as a self-contained object to be inserted within the location-based view.

Figure 3:
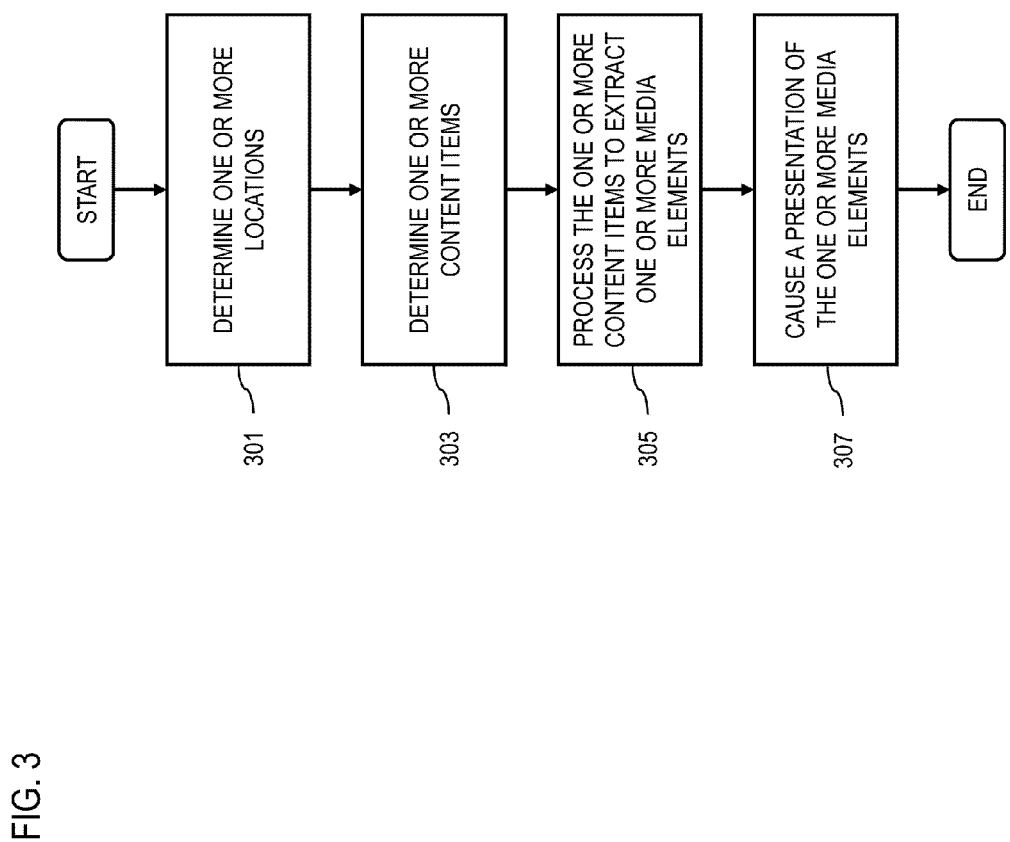
FIG. 3 is a flowchart of a process for incorporating media elements from content items into associated locations presented by a location-based view, according to one embodiment.
Figure 10:
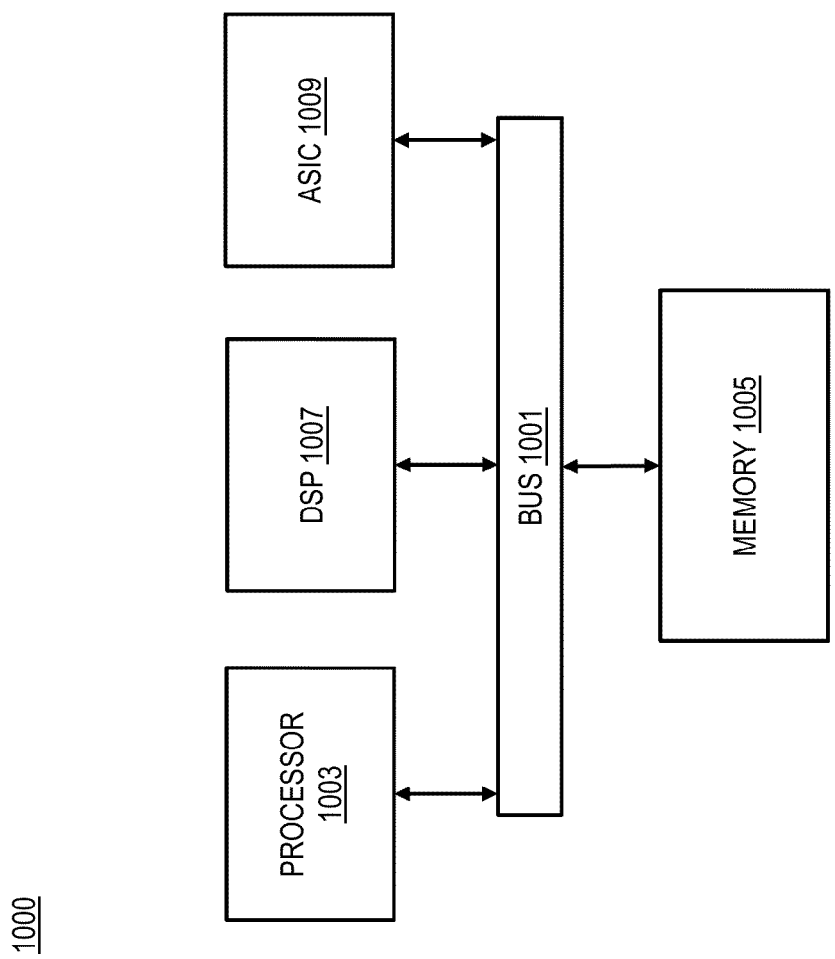
FIG. 10 is a diagram of a chip set that can be used to implement an embodiment of the invention.

FIG. 3 is a flowchart of a process for incorporating media elements from content items into associated locations presented by a location-based view, according to one embodiment. In one embodiment, the media element platform 103 performs the process 300 and is implemented in, for instance, a chip set including a processor and a memory as shown in FIG. 10. Although illustrated and described as containing four steps in the provided order, the process 300 may involve fewer than the four steps and may be arranged in a different order.

In step 301, the media element platform 103 determines one or more locations associated with at least one location-based view. The one or more locations may be a location that is present in the location-based view. The location-based view may be any type of view of a location, such as a mapping application providing a 2D or 3D view of a geographic area. The location-based view may also be an augmented reality presentation of data overlaid a live image of a geographic area. In the former case, the user does not need to be physically present in the location that the user is viewing in the location-based view. For example, the user may be in Washington, D.C. but may be looking at the Golden Gate Bridge using a 3D representation of the bridge provided for by an application 111a. In the latter case, the user is physically present or near the location that is within the location-based view because the view is based on the surroundings of the user.

The media element platform 103 may determine the location that is associated with the location-based view based on the source of the location-based view (e.g., an application 111a or a service 109a) providing information regarding the location. Such information may be based on, for example, geographic coordinates (e.g., GPS) or a previously determined correlation of image data with corresponding locations. The media element platform 103 may further determine the location by determining the geographic coordinates of the UE 101 that is presenting the location-based view based on, for example, the location-based view being augmented reality, and therefore requiring the user to be at or near the location associated with the view.

In step 303, the media element platform 103 determines one or more content items that are associated with the one or more locations. As discussed above, the content items may be associated with the locations if the locations are included within the content items. Thus, where the content item is a video, the video may include the location, such as by including a scene showing the Tower of London where the location is the Tower of London. Where the content item is an image, which may include text, the location may be associated with the text where the subject of the text is the location. Thus, where a book concerns a scene or describes Versailles, the location of Versailles is associated with the book (e.g., the content item). With respect to content items of a sound, such as one or more sound clips, the sound clips are associated with the location if, for example, the sound clip was recorded at or near the location, or involves a discussion of the location. Thus, for example, where a sound clip covers a rock concert at a specific venue, the location of the venue is associated with the content item of the sound clip. The sound clip may also be associated with the band that was performing during the concert.

At step 305, the media element platform 103 processes and/or facilitates a processing of the one or more content items to extract one or more media elements. In one embodiment, the media elements that are extracted from the content items may not be the location, but may rather be merely associated with the location. By way of example, in the scenario of the content item of King Kong the movie, the scene where King Kong climbs the Empire State building associates the content item with the location of the Empire State building. However, the Empire State building is not the media element that is extracted from the content item. Rather, the media element is the animation of King Kong climbing the Empire State building such that the animation may be incorporated into a representation of the Empire State building. Further, an image of the Statue of Liberty may be a content item that is associated with the Statue of Liberty. However, the media element that is extracted from the Statue of Liberty may be, for example, pieces of clothing from the image that are covering the Statue of Liberty. Further, where the content item is a book, for example, the media element that is extracted from the book may be an excerpt that is associated with a location, such as a passage from a book that describes the location, or a passage from the book that occurs that the location.

Further, as discussed above, in one embodiment, the media element platform 103 performs the analysis of the content items with respect to the locations to extract the media elements from the content items. Thus, for the example of King Kong, the media element platform 103 may extract the portions of the frames that include King Kong climbing up the Empire State building to represent King Kong, and may combine the images of King Kong together to create an animation such that the animation appears as though it has been lifted out of the movie. The media element platform 103 may perform the processing by, for example, image-based analysis, semantic-based analysis, and the like. Further, in one embodiment, the media element platform 103 may extract the media element from the content item merely by retrieving a media element from a database (such as the content items database 115) such that the media element platform 103 is not performing any of the actual extraction from the content item, but is instead merely extracting the media element from a database.

At step 307, the media element platform 103 causes, at least in part, a presentation of the one or more media elements in the at least one location-based view in association with the one or more locations. The media element platform 103 incorporates a media element from the content item within the location-based view such that the media element appears as part of the location-based view. Thus, in the case of King Kong, the animation of King Kong is associated with the location such that it appears that King Kong is climbing the representation of the Empire State building provided in the location-based view. Where the content item was an image, and the media element is a part of the image, such as the clothing on the Statue of Liberty, the media element platform 103 presents the clothing on the representation of the Statue of Liberty provided in the location-based view.

Further, the presentation of the one or more media may not be a visual presentation. Rather, where the content item is audio based, such as a song, the song may be presented by one or more audio outputs associated with the device (e.g., a UE 101*a*) that presents the location-based view and in association with the location based on presenting the song when the location is within the location-based view. By way of example, while the user is viewing a representation of New York City within a location-based view, the UE 101*a* associated with the presentation may play an audio clip of the song New York, N.Y. Accordingly, based on the presentation of the media elements in association with a location within a location-based view, a user may be enticed to use the location-based view more often. Further, as discussed above, functionality may be associated with the media elements, such as by providing links associated with the media elements to purchase the corresponding content items when a user selects one of the media elements, to further draw users, for example, to use the location-based views.

Figure 4:
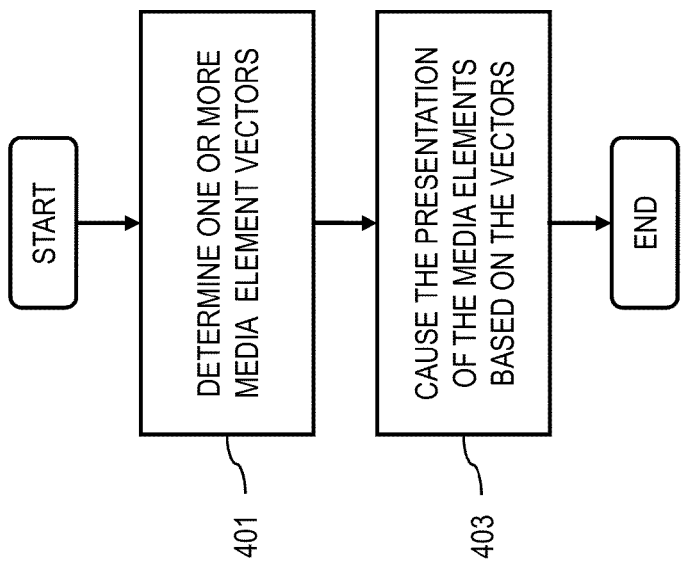
FIG. 4 is a flowchart of a process for determining one or more media element vectors, according to one embodiment.

FIG. 4 is a flowchart of a process for determining one or more media element vectors, according to one embodiment. In one embodiment, the media element platform 103 performs the process 400 and is implemented in, for instance, a chip set including a processor and a memory as shown in FIG. 10. In step 401, the media element platform 103 processes and/facilitates a processing on the one or more media elements with respect to the one or more locations to determine one or more media element vectors. The one or more media element vectors are associated with how the media element is presented within the location-based view and with respect to the location. In one embodiment, where the media element is associated with an animation, the media element vector defines the path of the animation. For example, in the case of King Kong, the media element vector defines the axis that the animation of King Kong climbs. As discussed above, the axis may be associated within a horizontal or vertical axis in association with a location. In the case of King Kong, the media element vector is associated with a vertical axis that is associated with the side of the Empire State building. In one embodiment, and in the case of an animation, a media element vector attempts to recreate the movement of the media element that occurs within the content item.

Where the media element is text, such as from a book, magazine, or any image that may contain text, the media element vector may define how the text appears within the location-based view and in relation to the location. The media element vector may define a surface and a location for the text to flow within the location-based view. The media element vector may be defined with respect to the location, such as having the text appear on the location. Further, the media element vector may be defined with respect to one or more features near the location. Where the location is, for example, a bridge, the media element vector may be defined as being the shape of the roadway of the bridge such that the text appears to be associated with the roadway of the bridge. Further, as discussed in detail below, the media element vector with respect to text may be segmented, such that portions of the text of a media element may be presented separately and based on the media element vector.

Similarly, where the media element is a sound, the media element vector associated with a sound may define how the sound is played or progressed as the user traverses a region represented in the location-based view. For example, a media element vector associated with a sound may require a user to start at one location within the location-based view and travel to one or more other locations (either physically or virtually) to be able to hear the entire sound, such as to be able to hear an entire song.

After determining the media element vector, at step 403, the media element platform 103 presents the media element based on the media element vector. Thus, where the media element vector is associated with an animation, the animation is presented along the media element vector. Further, the animation may be presented continuously and repeatedly along the media element vector. For an image based media element, such as the text media element described above, the text may be presented within the location-based view and associated with the location according to the media element vector, such as in the direction of the media element vector. For the case of an audio media element, the media element may be played according to when the user reaches a beginning of the media element vector, and may progress according to a user progressing along the media element vector, in at least one embodiment.

Figure 5:
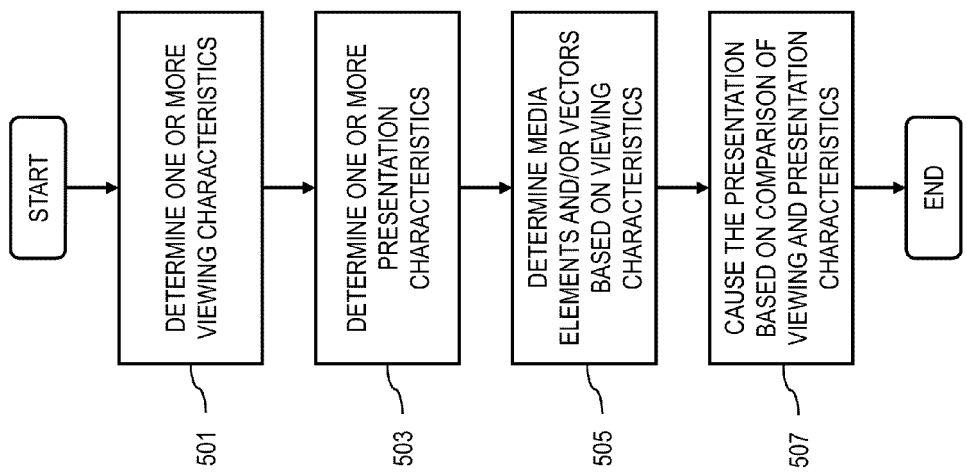
FIG. 5 is a flowchart of a process for incorporating media elements from content items based on viewing and/or presentation characteristics, according to one embodiment.

FIG. 5 is a flowchart of a process for incorporating media elements from content items based on viewing and/or presentation characteristics, according to one embodiment. In one embodiment, the media element platform 103 performs the process 500 and is implemented in, for instance, a chip set including a processor and a memory as shown in FIG. 10. Although illustrated and described as containing four steps in the provided order, the process 500 may involve fewer than the four steps and may be arranged in a different order. In step 501, the media element platform 103 may determine one or more viewing characteristics associated with the at least one location-based view. The viewing characteristics may be any characteristic that defines the view of the location-based view. In one embodiment, a characteristic could be whether the view is a 2D or 3D representation, whether the representation is associated with augmented reality, virtual reality, or the like. The viewing characteristics may also include the viewing angle, the field of view, and the like associated with the entire location-based view, or with respect to the location within the location-based view. In one embodiment, the viewing characteristics may be whether the location is represented as being at night, during the day, or like.

In step 503, the media element platform 103 determines one or more presentation characteristics associated with the media elements within the one or more content items. In one embodiment, the presentation characteristics associated with the media elements within the content items pertain to visual presentation characteristics. Further, the presentation characteristics of the media elements in the content items may correlate to the viewing characteristics of the location-based view. Thus, for example, the presentation characteristics may include the viewing angle of a camera that camera captured a video with respect to the subject of the video. The characteristics may also include the field of view of the video, or the field of view that is filled by the subject of the video (which may correspond to the location).

In step 505, the media element platform 103 determines the one or more media elements, the one or more media element vectors, or a combination thereof based, at least in part, on the one or more viewing characteristics. The viewing characteristics may be used to limit which media element may be presented within the location-based view. For example, if the location-based view is according to a top-down 2D view of a map, only media elements that are compatible with such a view may be used. The same may be true for other viewing characteristics, such as if the Empire State building fills the field of view, the animation of King Kong may not be possible because, for example, the top of the Empire State building may not be visible.

Further, based on the viewing characteristics, the media element vector may be determined. The media element vector may be determined, for example, to follow the perspective within the location-based view. For example, a passage of a book may be formatted according to a media element vector such that the passage of the book extends off into the distance and out of view. A passage of a book may also be formatted according to a media element vector such that the passage has the same perspective of the location that the passage is associated with, such as a passage having the same perspective based on the media element vector as a fountain that is described in the passage. Further, based on the viewing characteristics, a number of steps, for example, may be determined to divide a media element into the correct number of passages based on how many steps a user must take to proceed from a starting point and to an ending point to obtain the full portion of the passage. The same analysis may be performed for audio media elements.

In step 507, the media element platform 103 may further cause, at least in part, the presentation of the one or more media elements based, at least in part, on a comparison of the one or more presentation characteristics and the one or more viewing characteristics. Thus, the presentation of the one or more media elements may or may not occur based on the comparison of the characteristics. Thus, where the presentation characteristics of the media element within the content item do no match the viewing characteristics of the location-based view, the media element may not be incorporated into the location-based view. By way of example, where the location-based view is associated with night, and the presentation of the media element within the content item is associated with the day, the media item may not be presented within the location-based view. Further, where a media element is incorporated into a location-based view and the field of view of the location-based view subsequently changes such that it no longer is within a threshold of the field of view of the presentation within the content item, the media element may be removed from the location-based view. Further, the opposite may be true, such that the media element may not be presented within the location-based view until a change in the field of view.

In one embodiment, the threshold for comparison of the viewing characteristics and the presentation characteristics may be narrow so if a media element is incorporated into a location-based view, the media element closely resembles the presentation within the content item. In one embodiment, the threshold for the comparison may be large. In this embodiment, the threshold may be large based on, for example, the ability of the media element platform 103 to interpolate the media element and properly adjust the various viewing characteristics.

Figure 6:
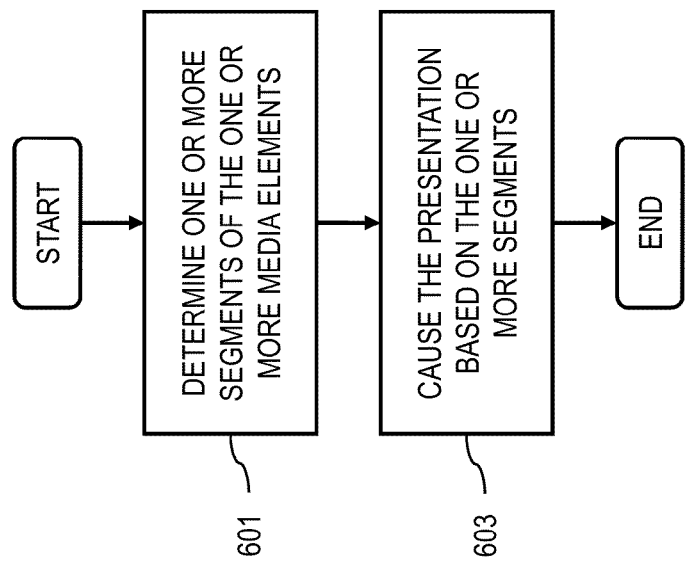
FIG. 6 is a flowchart of a process for presenting one or more segments of the media elements, according to one embodiment.

FIG. 6 is a flowchart of a process for presenting one or more segments of the media elements, according to one embodiment. In one embodiment, the media element platform 103 performs the process 600 and is implemented in, for instance, a chip set including a processor and a memory as shown in FIG. 10. In step 601, the media element platform 103 determines one or more segments of the one or more media elements based, at least in part, on the one or more locations, the at least one location-based view, or a combination thereof. The one or more segment of the media elements may be, for example, one or more segments of an animation, one or more smaller excerpts of an excerpt of text, one or more shorter sound clips of a single sound clip, and the like.

The segments may be determined based on the location and/or the location-based view. In the context of an animation, the animation may change when the animated figure reaches a certain point of the location and/or the location-based view. For example, as a user traverses a road within a city, the media element of an animation of a truck following the user and extracted from a content item may appear a certain way. The animation may change after the user crosses a certain intersection, such as the truck becoming closer and/or flashing its lights. Thus, the media element of the animated truck may be segmented into the two segments and be based on the location of the intersection. Further, as described above, a passage of text may be divided into segments. As the user changes views such that the location-based view changes, the user may be provided with different segments of the text. The segments (e.g., the length of each segment, the number of segments, etc.) may be determined based on the different location-based views. The same segmentation may occur with audio media elements.

In step 603, the media element platform 103 causes, at least in part, the presentation of the one or more media elements based, at least in part, on the one or more segments in the at least one location-based view. The segments of the media elements are presented according to the segmentation with respect to the one or more locations and/or the at least one location-based view. Thus, as described above, as the user progresses through the location-based view by, for example, traveling down a road, an animation incorporated into the location-based view may change based on changes to the location-based view, such as the animation progressing to the next stage of the animation. By way of a further example, if a user is a certain distance away from the Empire State building (either physically or virtually), the animation of King Kong may be based on one segment of the animation, such as King Kong being closer to the ground. However, as the user gets closer to the Empire State building (either physically or virtually), the animation of King Kong may travel farther up the Empire State building based on a second segment of the animation.

Further, by way of example, as the user travels through a museum (either physically or virtually) such that the location-based view changes (e.g., new artwork is displayed), the segments of a media element of a passage of a book describing the artwork may similarly progress based on the change. Where the book is instead in an audio file, such as spoken text, the segmented audio file may be progressed based on the progression of the location-based view representing the virtual or physical progression of the user through the museum.

Figure 7:
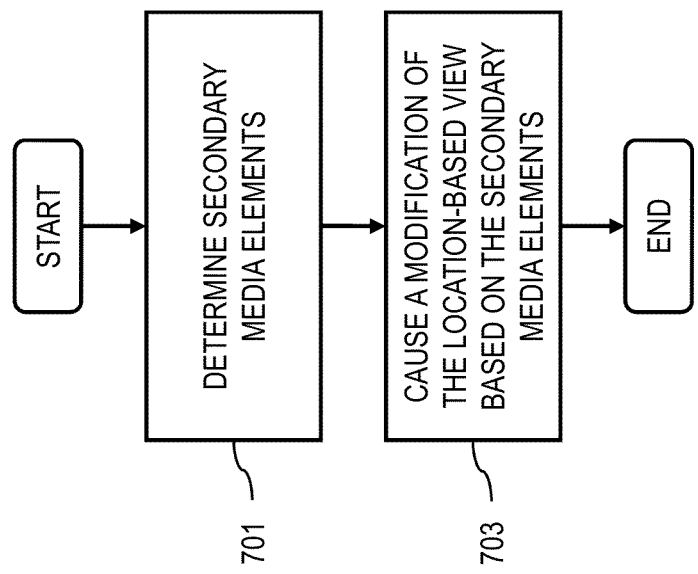
FIG. 7 is a flowchart of a process for modifying a location-based view based on secondary media elements, according to one embodiment.

FIG. 7 is a flowchart of a process for modifying a location-based view based on secondary media elements, according to one embodiment. In one embodiment, the media element platform 103 performs the process 700 and is implemented in, for instance, a chip set including a processor and a memory as shown in FIG. 10. In step 701, the media element platform 103 processes and/or facilitates a processing of the one or more content items to determine one or more secondary media elements associated with the one or more media elements. The secondary media elements may be considered props, in the context of video content items that are associated with the media element. In the case of King Kong, for example, and as discussed above, the props may be the planes flying around King Kong at the top of the Empire State building, or the damsel in distress that King Kong may be holding. Thus, the secondary media elements may be within the content item and be associated with the media element or interact with the media element.

In step 703, the media element platform 103 causes, at least in part, a modification of the at least one location-based view based, at least in part, on the one or more secondary media elements. In this step, the media element platform 103 may modify the location-based view by adding representations of the props determined in step 701 to the location-based view. Thus, unlike the incorporation of the media element into the location-based view, which was an extraction of the media element from the content item, the addition of the secondary media elements may simply be representations of the media elements rather than the secondary media elements themselves. Thus, by way of example, instead of extracting the planes that fly around King Kong's head, the media element platform 103 may obtain a model of a plane and add the model to the location-based view flying around King Kong's head. Accordingly, the media element platform 103 may further immerse the user within the content item and/or incorporate the environment of the media element into the location-based view by incorporating props associated with the media element, or that interact with the media element.

Figure 8A:
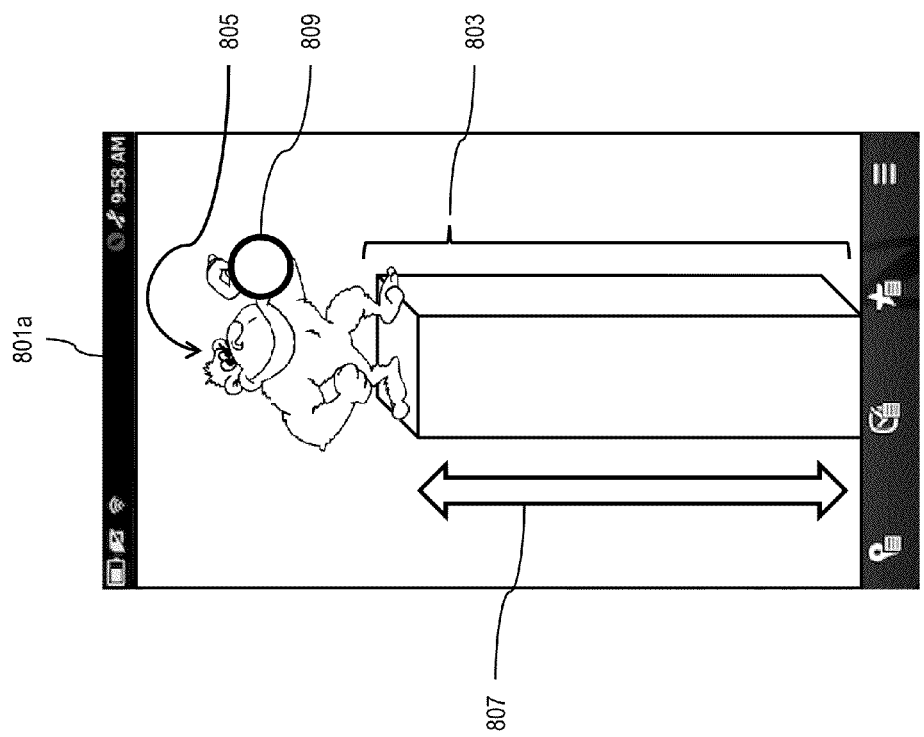
FIGS. 8A-8D are diagrams of user interfaces utilized in the processes of FIGS. 3-7, according to various embodiments.

FIGS. 8A-8D are diagrams of user interfaces utilized in the processes of FIGS. 3-7, according to various embodiments. FIG. 8A illustrates a user interface 801a of a UE 101a presenting a location-based view. In the illustrated example, the location-based view may include, for example, a location 803. For purposes of simplification of the illustration, the location 803 may be represented by the 3D wireframe building. However, the representation of the location 803 may be any level of detail, such as a live image captured by a camera of the UE 101a, a photograph of the building mapped to a 3D model of the building, and the like. By way of example, the location 803 may correspond to a live image of the Empire State building that is currently presented within the user interface 801a as an augmented reality view of New York City. Further, at the top of the location 803 may be a media element 805 of a monster, for example, that may have been extracted from a content item. By way of example, the media element 805 may represent the monster King Kong from the content item of the movie King Kong. Further, the user interface 801a may include an indicator 807 representing a media element vector (for illustrative purposes only and not displayed within the actual user interface 801a). The indicator 807 of the media element vector indicates the direction the media element 805 moves with respect to the location 803. Thus, the monster represented by the media element 805 may be animated and appear to climb up and down the location 803, repetitively.

Further, in one embodiment, as discussed above, the media element platform 103 may allow for interactions between the user and a media element, such as an animated media element. Thus, by way of example, a user may touch the user interface as represented by the indicator 809. The media element 805 may then interact with where the user touched the touch screen. In the present example, the media element 805 may appear to reach out to grab the point of contact and, if the finger remains on the touch screen, may be configured by the media element platform 103 to become associated with the finger represented by the indicator 809 rather than the location 803. In which case, the media element vector represented by the indicator 807 may become associated with the user's finger and the movement of the media element 805 based on the media element vector may be with respect to the user's finger.

Figure 8B:
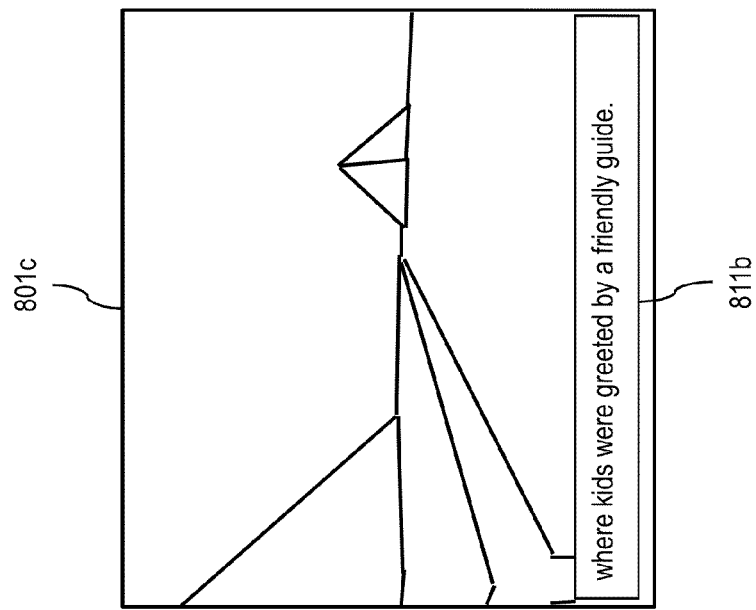
Figure 8B:
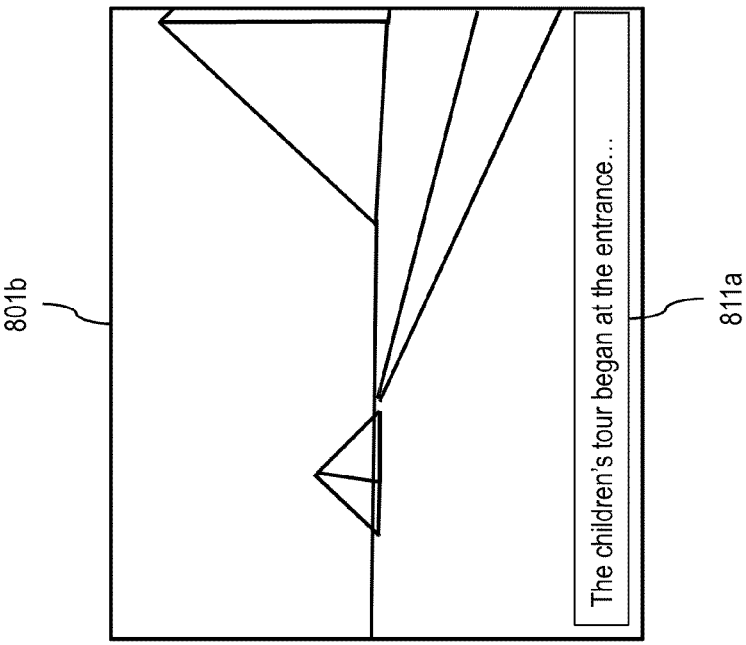
Figure 8C:
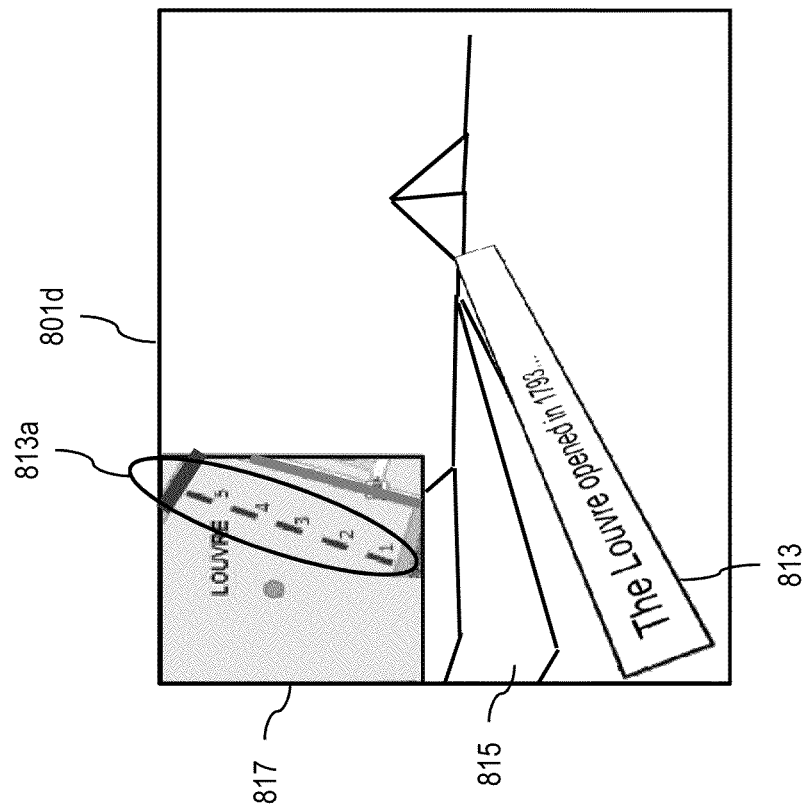

FIG. 8B illustrates how the change of a location-based view may be associated with a change in the media element, such as a presentation of a different segment of the media element. As discussed above, although the user interfaces 801b and 801c are wireframe, the location-based view may be any level of detail. User interface 801b in FIG. 8B represents a location-based view of, for example, the Louvre. The user may either by physically present at the Louvre (e.g., in the case of augmented reality) or virtually present at the Louvre (e.g., in the case of an application providing a virtual tour). For the purposes of describing the embodiment of FIG. 8B, a content item may be a book that includes, for example, a scene or a chapter that takes place at the Louvre. Representations 811a and 811b may represent segments of a media element that is extracted from the book and that is associated with the Louvre by, for example, being an excerpt of the scene or chapter in the book. As the user pans from the left to the right to view more of the Louvre, as illustrated by user interfaces 801b and 801c, the media element platform 103 may cause the media element, specifically a segment of the media element that is presented within the user interface, to change from the segment illustrated by representation 811a to 811b. If the user does not pan to the right, the user is not able to see the segment of the media element according to representation 811b. However, if the user pans back to the left, the user may again see the segment of the media element according to representation 811a.

In the example illustrated in FIG. 8B, the media element, or segments of the media element, may be simply overlaid on the image of the Louvre, and thereby be generally associated with the location of the Louvre. In one embodiment, as illustrated in the user interface 801d of FIG. 8C, the media element 813 may be formatted according to a media element vector that maps the media element 813 to the perspective of the location (e.g., the edge of the fountain 815) within the location-based view depicted by the user interface 801d. Further, as illustrated by the legend 817, the media element 813 may be divided into five segments 813a that may be viewed as the user progresses down the media element 813.

Figure 8D:
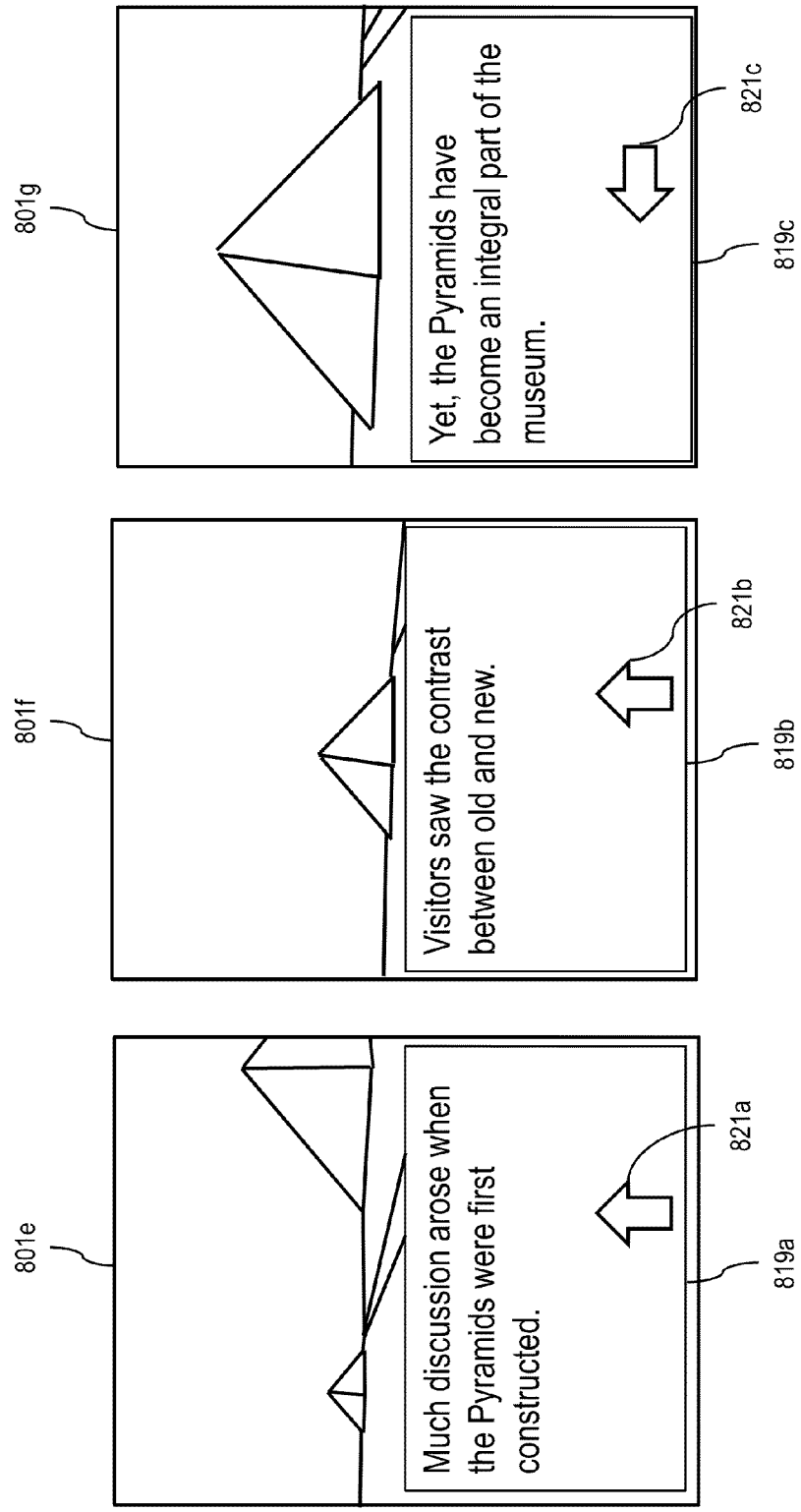

Further, as illustrated in FIG. 8D, the media element vector may include instructions regarding the change in the location-based view that is required to progress to the next segment of the media element. As illustrated in FIG. 8D, the user interface 801e may include a representation of the Louvre and also a segment 819a of a media element that, like before, was from a content item and concerns the location of the Louvre. The segment 819a of the media element may further include a direction indicator 821a that indicates the change in the location-based view that is required to progress through the segments of the media element. Thus, as illustrated by the indicator 821a, a user must move forward to view the next segment. Assuming the user has moved forward, either physically or virtually, a second segment 819b of the media element is presented that includes a second indicator 821b of another action required for a user to view the next segment by user interface 801f. Assuming the user has moved forward again, either physically or virtually, a third segment 819c of the media element is presented that includes a third indicator 821c of another action required for a user to view the next segment by user interface 801g. The user interfaces, media segments and indicators may progress according to the media element vector such that the user progresses from the beginning to the end of the media element. In one embodiment, the media element vector created according to the above causes a user to follow the same path that is, for example, followed by a character discussed in the media element. Further, by way of example, upon the user reaching the end of the media element, that user may be given an option to purchase the content items associated with the media element in the case that the user enjoyed the excerpt that he or her read.

The processes described herein for incorporating media elements from content items into associated locations presented by a location-based view may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
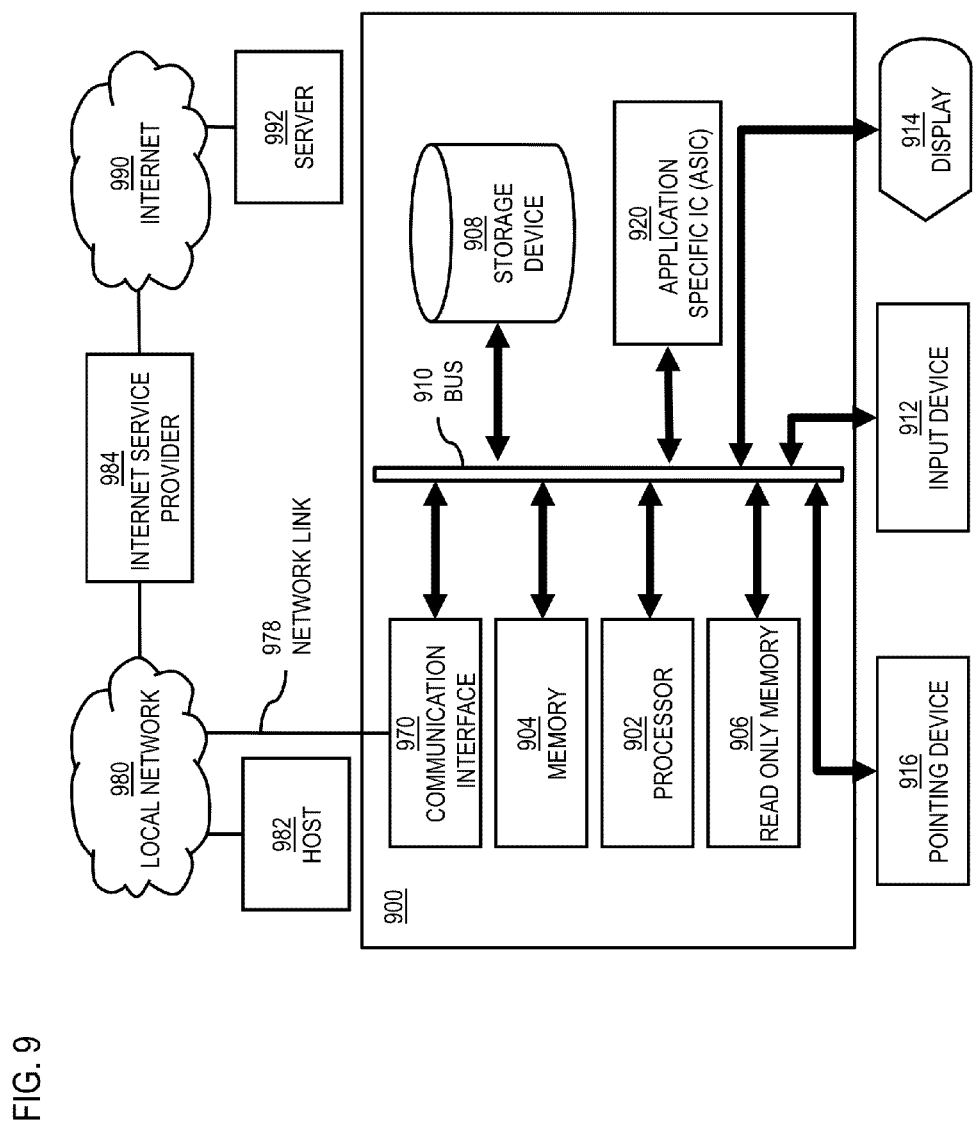
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to incorporate media elements from content items into associated locations presented by a location-based view as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of incorporating media elements from content items into associated locations presented by a location-based view.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to incorporating media elements from content items into associated locations presented by a location-based view. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for incorporating media elements from content items into associated locations presented by a location-based view. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for incorporating media elements from content items into associated locations presented by a location-based view, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for incorporating media elements from content items into associated locations presented by a location-based view at the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to incorporate media elements from content items into associated locations presented by a location-based view as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of incorporating media elements from content items into associated locations presented by a location-based view.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to incorporate media elements from content items into associated locations presented by a location-based view. The memory 1005 also stores the data associated with or generated by the execution of the inventive steps.

Figure 11:
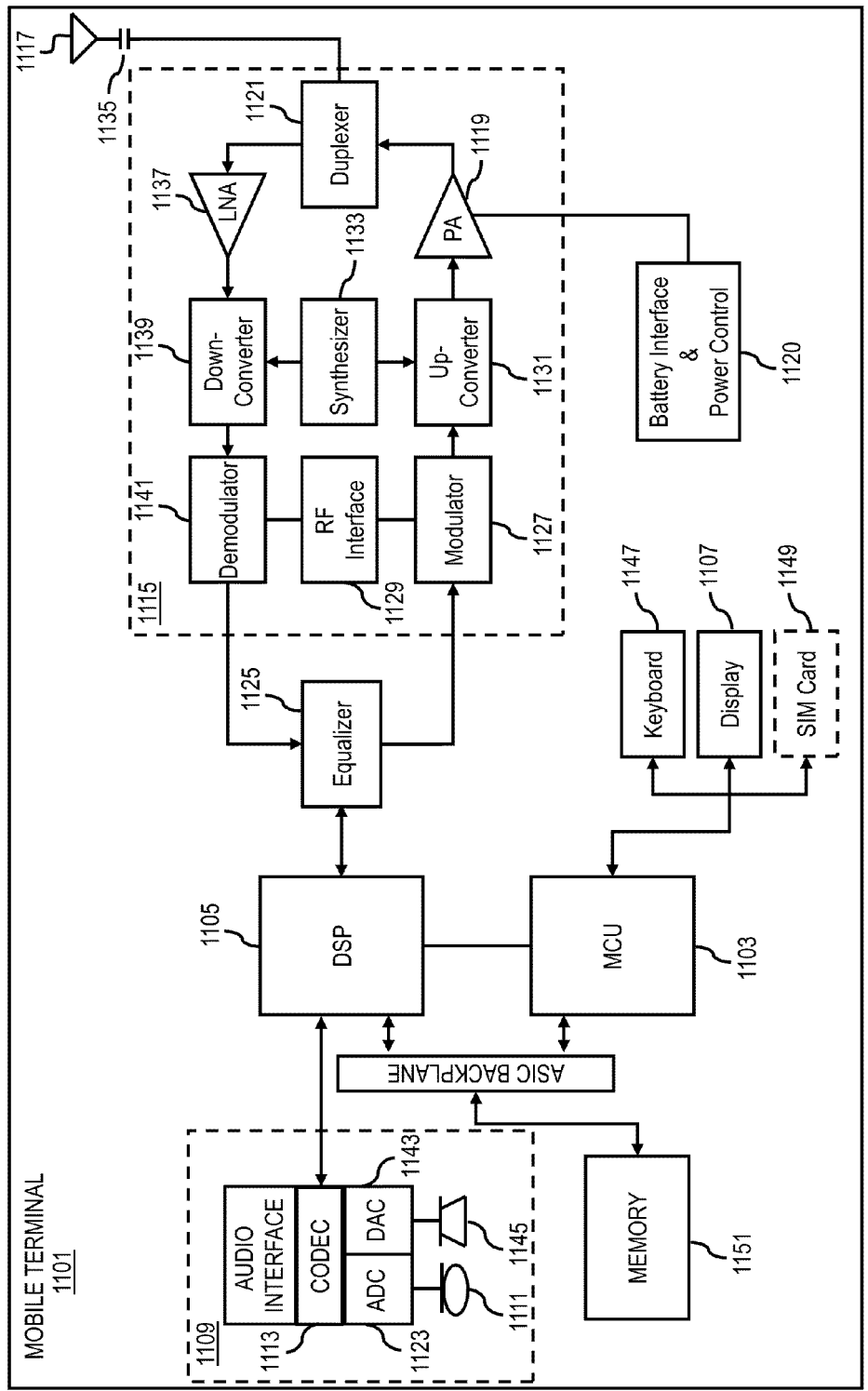
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of incorporating media elements from content items into associated locations presented by a location-based view. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of incorporating media elements from content items into associated locations presented by a location-based view. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to incorporate media elements from content items into associated locations presented by a location-based view. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   processing data and information and at least one signal, the data and information and at least one signal based, at least in part, on one or more locations associated with at least one location-based view, and one or more content items associated with the one or more locations;
   processing the one or more content items to extract from within at least one of the one or more content items one or more media elements;
   processing the one or more media elements with respect to the one or more locations to determine one or more media element vectors;
   presenting the one or more media elements based, at least in part, on the one or more media element vectors;
   processing the one or more content items to determine one or more secondary media elements associated with the one or more media elements; and
   modifying the at least one location-based view based, at least in part, on the one or more secondary media elements.

2. A method of claim 1, wherein the data and information and at least one signal are further based, at least in part, on
   one or more viewing characteristics associated with the at least one location-based view, and
   at least one determination of the one or more media elements, the one or more media element vectors, or a combination thereof based, at least in part, on the one or more viewing characteristics.

3. A method of claim 2, wherein the data and information and at least one signal are further based, at least in part, on
   one or more presentation characteristics associated with the media elements within the one or more content items; and
   the presentation of the one or more media elements based, at least in part, on a comparison of the one or more presentation characteristics and the one or more viewing characteristics.

4. A method of claim 1, wherein the data and information and at least one signal are further based, at least in part, on
   one or more user inputs associated with the presentation of the one or more media elements; and
   a modification of the one or more media elements vectors based, at least in part, on the one or more user inputs.

5. A method of claim 1, wherein the data and information and at least one signal are further based, at least in part, on
   one or more segments of the one or more media elements based, at least in part, on the one or more locations, the at least one location-based view, or a combination thereof; and
   the presentation of the one or more media elements based, at least in part, on the one or more segments in the at least one location-based view.

6. A method of claim 5, wherein the data and information and at least one signal are further based, at least in part, on
   one or more changes to the at least one location-based view; and
   a progression through the one or more segments of the one or more media elements based, at least in part, on the one or more changes.

7. A method of claim 6, wherein the progression is based, at least in part, on a match between a progression within the one or more media elements, the one or more content items, or a combination thereof and a progression within the at least one location-based view.

8. A method of claim 1, wherein the data and information and at least one signal are further based, at least in part, on
   at least one determination of the one or more content items based, at least in part, on one or more histories, one or more preferences, or a combination thereof associated with a device, a user of the device, or a combination thereof.

9. An apparatus comprising:
   at least one processor; and
   at least one memory including computer program code for one or more programs, the at least one memory and the computer program code configured to, with the at least one processor, cause the apparatus to perform at least the following,
   determining one or more locations associated with at least one location-based view;
   determining one or more content items associated with the one or more locations;
      processing the one or more content items to extract from within at least one of the one or more content items one or more media elements;
   processing the one or more media elements with respect to the one or more locations to determine one or more media element vectors;
   causing, at least in part, a presentation of the one or more media elements based, at least in part, on the one or more media element vectors;
   processing the one or more content items to determine one or more secondary media elements associated with the one or more media elements; and
   causing, at least in part, a modification of the at least one location-based view based, at least in part, on the one or more secondary media elements.

10. An apparatus of claim 9, wherein the apparatus is further caused to:

determining one or more viewing characteristics associated with the at least one location-based view; and determining the one or more media elements, the one or more media element vectors, or a combination thereof based, at least in part, on the one or more viewing characteristics.

11. An apparatus of claim 10, wherein the apparatus is further caused to:

determining one or more presentation characteristics associated with the media elements within the one or more content items; and causing, at least in part, the presentation of the one or more media elements based, at least in part, on a comparison of the one or more presentation characteristics and the one or more viewing characteristics.

12. An apparatus of claim 9, wherein the apparatus is further caused to:

determining one or more user inputs associated with the presentation of the one or more media elements; and causing, at least in part, a modification of the one or more media elements vectors based, at least in part, on the one or more user inputs.

13. An apparatus of claim 9, wherein the apparatus is further caused to:

determining one or more segments of the one or more media elements based, at least in part, on the one or more locations, the at least one location-based view, or a combination thereof; and causing, at least in part, the presentation of the one or more media elements based, at least in part, on the one or more segments in the at least one location-based view.

14. An apparatus of claim 13, wherein the apparatus is further caused to:

determining one or more changes to the at least one location-based view; and causing, at least in part, a progression through the one or more segments of the one or more media elements based, at least in part, on the one or more changes.

15. An apparatus of claim 14, wherein the progression is based, at least in part, on a match between a progression within the one or more media elements, the one or more content items, or a combination thereof and a progression within the at least one location-based view.

16. An apparatus of claim 9, wherein the apparatus is further caused to:

determining the one or more content items based, at least in part, on one or more histories, one or more preferences, or a combination thereof associated with a device, a user of the device, or a combination thereof.

* * * * *